United States Patent
Poinsard

[15] 3,680,102
[45] July 25, 1972

[54] RECEIVERS FOR ANGULAR MEASUREMENT SYSTEMS, IN PARTICULAR TO RADAR SYSTEM RECEIVERS

[72] Inventor: Henri Poinsard, Paris, France
[73] Assignee: Thomson-CSF
[22] Filed: Feb. 12, 1970
[21] Appl. No.: 11,036

[30] Foreign Application Priority Data

Feb. 19, 1969 France..................................6904134

[52] U.S. Cl.........................................................343/16 M
[51] Int. Cl..........................................G01s 9/22, G01s 9/52
[58] Field of Search................................................343/16 M

[56] References Cited

UNITED STATES PATENTS

| | | | |
|---|---|---|---|
| 3,339,199 | 8/1967 | Pichafroy | 343/16 M |
| 3,378,849 | 4/1968 | Letellier | 343/16 M |
| 3,495,246 | 2/1970 | Schoneborn | 343/16 M |
| 3,560,974 | 2/1971 | Lecourtier et al. | 343/16 M |

Primary Examiner—Malcolm F. Hubler
Attorney—Cushman, Darby & Cushman

[57] ABSTRACT

In a receiver of an angular measurement system of the type in which an angular indication is given by the ratio of two simultaneously received signals A and B, the useful signal is obtained through alternately phase detecting signals $A + jB$ and $A - jB$ with either signal A or alternately signals $A - jB$ and $A + jB$, and alternately inverting the sign of the phase detection signal thus obtained. Distortions due to amplification are thus avoided.

9 Claims, 5 Drawing Figures

RECEIVERS FOR ANGULAR MEASUREMENT SYSTEMS, IN PARTICULAR TO RADAR SYSTEM RECEIVERS

The present invention relates to those receivers of angular measurement systems, for example radar systems, in which an angular indication of the target position is obtained by forming the ratio of two simultaneously received signals.

In such receivers, the circuits delivering this angular indication generally comprise two amplifying channels, of the linear or of the limiting type, according to the circuit design, which channels introduce distortions into the graph function relating signal and angular indication and/or a zero error.

The invention relates more particularly to a device for generating a signal indicating the angular position of a target, which device is free of these drawbacks.

According to the invention, there is provided a receiver comprising : first means having two terminals for simultaneously receiving two signals A and B whose ratio gives an indication of the angular position of a target; second means coupled to said first means, for elaborating signals $A + jB$ and $A - jB$ where signal $jB$ has the same amplitude as signal B and has a phase shifted by $\pi/2$ with respect to that of signal B , said second means having two outputs; a limiting amplifier having an input and an output; control means for alternately coupling said amplifier input to said two outputs of said second means; phase detecting means having a first input coupled to said amplifier output, a second output, and an output; means coupled to said last mentioned output, for, alternately, in synchronism with said control means, multiplying by $+1$ and $-1$ the signal supplied at said detecting means output; and further means for applying to said detecting means second input a signal which is a function of at least one of signals A and B .

The term "phase detecting means" as used here, is intended to designate any apparatus which, when supplied with two constant-amplitude signals, delivers a signal which is a function solely of the phase shift between these two signals.

For a better understanding of the invention and to show how the same may be carried into effect reference will be made to the drawings accompanying the ensuing description and in which.

Figure 1:
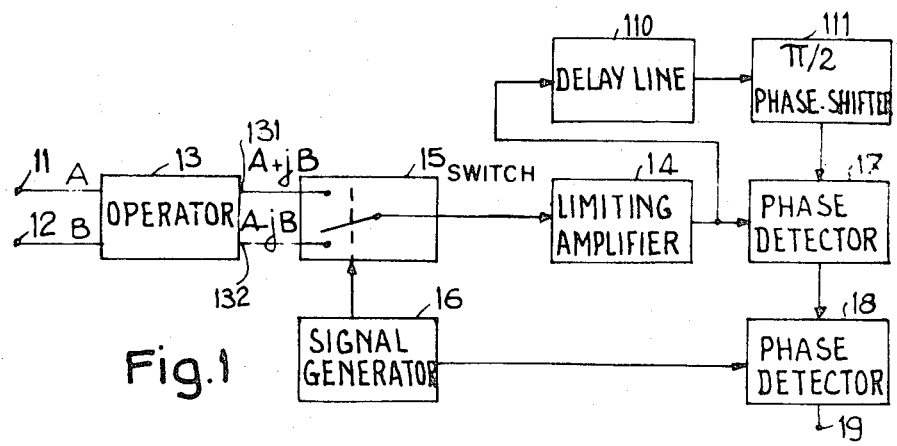
FIGS 1, 2 and 3 illustrate improved receiver circuits in accordance with the invention.
Figure 2:
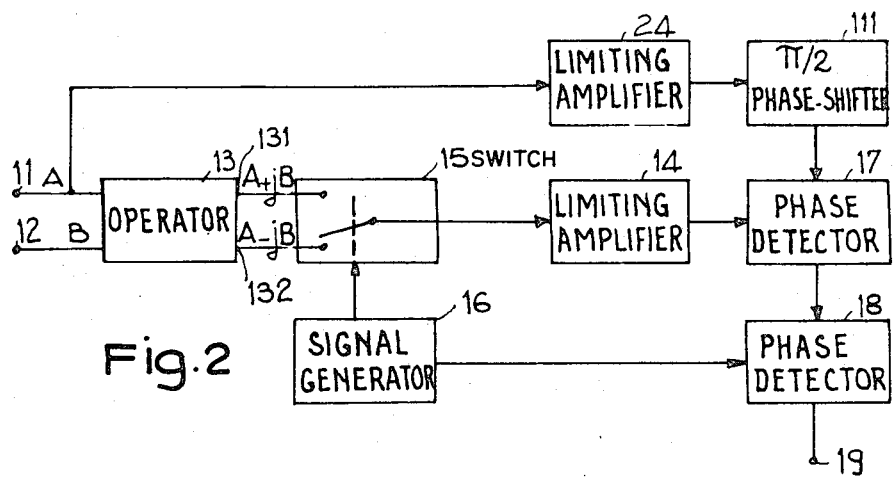
Figure 3:
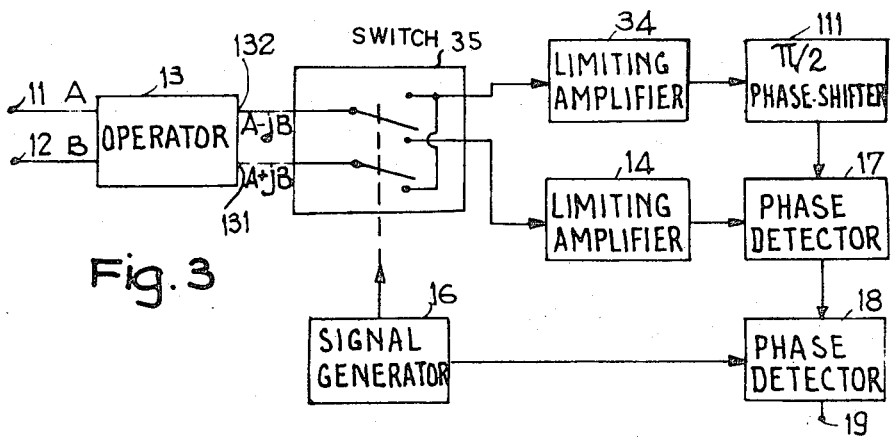

In FIGS 1, 2 and 3 , only those of the known parts of the receiver which are necessary to the description of the present invention have been illustrated; these known parts are common to the three examples illustrated.

The two signals A and B , whose ratio B/A is an indication of the angular position of the target, are applied to the terminals 11 and 12 of the receiver. Where a monopulse radar system is concerned, signals A and B are respectively the conventional sum and difference signals, the ratio of which is the indication known as pointing angle error.

Preferably, terminals 11 and 12 are the intermediate frequency input terminals of the receiver, and this will be assumed to be the case in this example.

An operator 13 of known type, coupled to the inputs 11 and 12, respectively supplies at its two outputs 131 and 132 the signals $A + jB$ and $A - jB$ , signal $jB$ being obtained from signal B through phase shifting the latter by $\pi/2$ . A limiting amplifier 14 is coupled alternately to the terminals 131 and 132 through a switch 15 controlled by a rectangular waveform signal generator 16 , the frequency of which is $f_c$ , so that switch 15 changes its position with the frequency $2f_c$ . The output of the amplifier 14 is coupled to one of the inputs of a phase-detector 17.

In a first embodiment of the invention, shown in FIG. 1, the second input of the detector 17 is connected to the output of the amplifier 14 through a delay line 110 , followed by a $\pi/2$ phase-shifter 111 , the delay introduced by the line being equal to $1/(2f_c)$.

In a second embodiment of the invention, shown in FIG. 2, the second input of the detector 17 is connected to the terminal 11 through a limiting amplifier 24 substantially identical to device 14 and followed by the $\pi/2$ phase-shifter 111 .

In yet another embodiment of the invention, shown in FIG. 3, the terminals 131 and 132 are alternately coupled to a second limiting amplifier 34 , substantially identical to the first, by means of a second switch also controlled by the generator 16 and operating in phase-opposition with the first switch ; in practice, the two switches are combined in a common equipment 35 , the phase-shifter 111 being coupled in series with said second amplifier, between the switch and the second input of the detector 17 .

Depending upon whether the amplifier 14 is coupled to one or the other output terminal of the circuit 13 , the output signal from the phase-detector 17 of FIG. 1 or FIG. 3 has the form $\sin 2\Phi$ or $-\sin 2\Phi$ . Depending upon the same coupling the output signal from the phase detector 17 of FIG. 2 will have the form $\sin \Phi$ or $-\sin \Phi$ . In order to correct this undesired alternation, the output signal of the detector 17 must alternately be maintained and inverted, this alternation occurring at the frequency $f_c$ . To this end, there is provided in FIGS 1, 2 and 3 , a phase-detector 18, whose inputs are connected to the output of the detector 17 and to that of the generator 16, this phase detector 18 thus supplying the angle indicating signal at the terminal 19.

The operation of the circuits shown in FIGS 1 to 3 will now be explained in more detail.

With each half-cycle of operation of the switch (15 FIGS 1 and 2, 35 FIG. 3), the phase of one of the signals $A + jB$ and $A - jB$ is measured in relation to that of the other (FIGS 1 and 3) or in relation to that of signal A (FIG. 2).

There is thus obtained, at the output of the detector 17 , a squarewave of frequency $f_c$ whose peak-to-peak amplitude is given by $2 \sin 2\Phi$ in the case of FIGS 1 and 3 and by $2 \sin \Phi$ in the case of FIG. 2, the signal being in phase or in opposition with the switching wave.

Taking the example of the device shown in FIG. 1, the interest of the present invention will now be shown :

The phase-shift of the signal $A + jB$ with respect to signal $A - jB$ , is $2\Phi$ .

In the absence of any parasitic phase-shift, the signal applied to the second input of the detector 17 has, with respect to the signal applied to its first input a phase-shift, which alternates between $2\Phi - \pi/2$ and $-2\Phi \pi/2$ so that the detector 17 alternately supplies signals proportional to $$\sin 2\Phi \text{ and} -\sin 2\Phi$$

and this gives a peak-to-peak amplitude of $2 \sin 2\Phi$ .

Let it be assumed that a parasitic phase-shift $\alpha$ , occurs, between the signal supplied to the second input and that supplied to the first input of phase detector 17.

The phase-shift between the two input signals of the detector 17 will then be alternately equal to $$2\Phi - \pi/2 - \alpha \text{ and} -2\Phi - \pi/2 - \alpha.$$

The detector 17 will then alternately supply $\sin(2\Phi - \alpha)$ and $-\sin(2\Phi + \alpha)$ and this corresponds to a peak-to-peak amplitude of $$\sin(2\Phi - \alpha) + \sin(2\Phi + \alpha) = 2 \sin 2\Phi \cos \alpha.$$

The error in the peak-to-peak amplitude is thus a second order function of $\alpha$.

It can be shown in a similar manner, that in the case of FIG. 2 the peak-to-peak amplitude is also a second order function of $\alpha$.

The output signal from the apparatus, which is proportional to the peak-to-peak amplitude, is therefore not affected except by second order terms of $\alpha$. On the other hand, the signal indicating a zero pointing error is not altered at all.

The possible unbalance of the intermediate frequency detector 17 has no influence on the output signal since it only manifests itself in the superimposition of a d.c. voltage upon the useful signal at 19, which d.c. voltage may be easily eliminated through filtering, the useful signal being an alternating signal of frequency $f_c$, which frequency has to be about twice higher than the highest modulation frequency of the received signals.

In continuous wave radar systems, it will suffice to make $f_c$ in the order of 200 c/s, the maximum modulation frequency of parasitic signals generally not exceeding 100 c/s.

In the case of pulse systems, the whole of the information will be retained as long as $f_c > 2f_r$, $f_r$ being the pulse repetition frequency.

Figure 4:
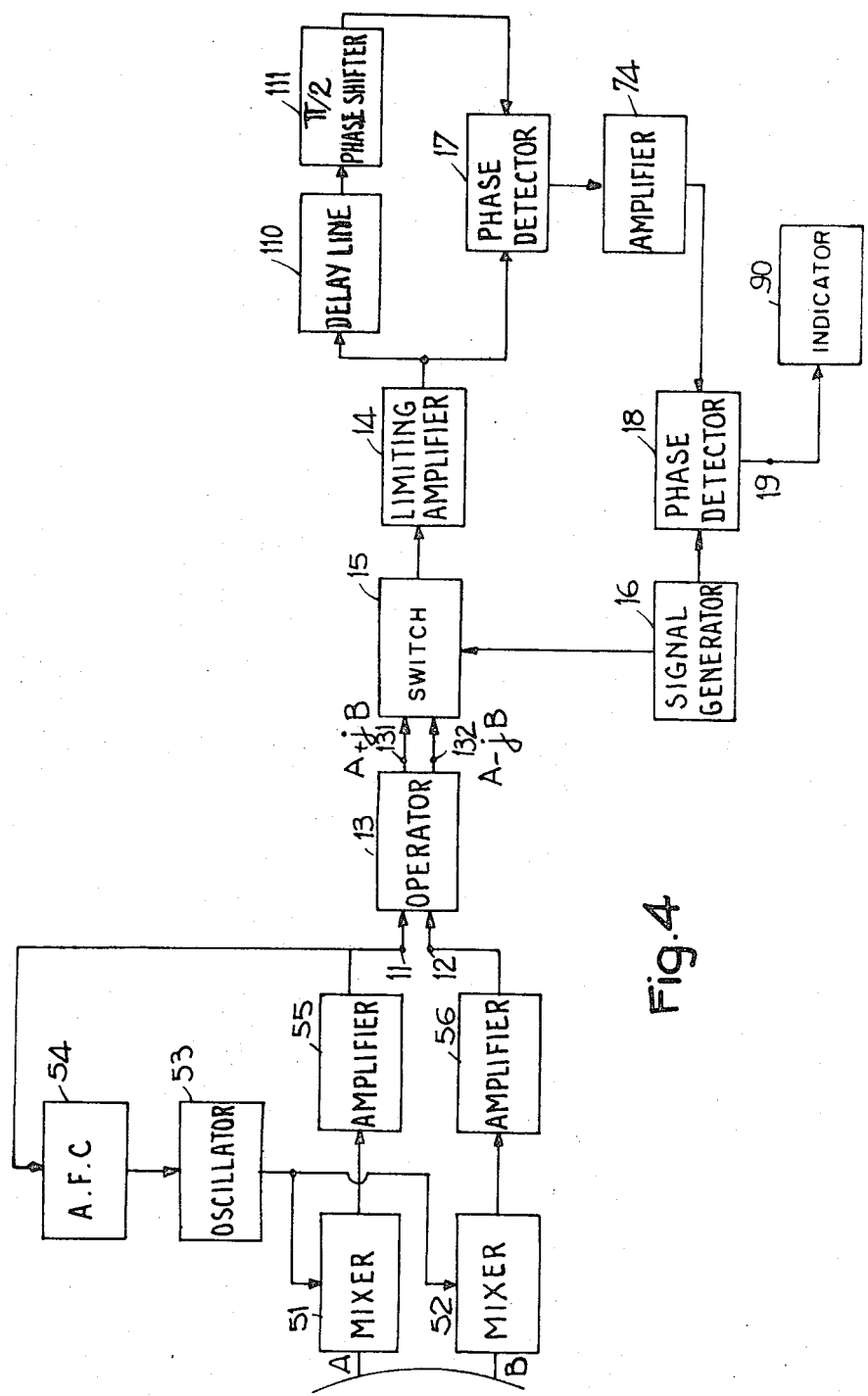
FIGS 4 and 5 illustrate examples of systems comprising receiver circuits in accordance with the invention.
Figure 5:
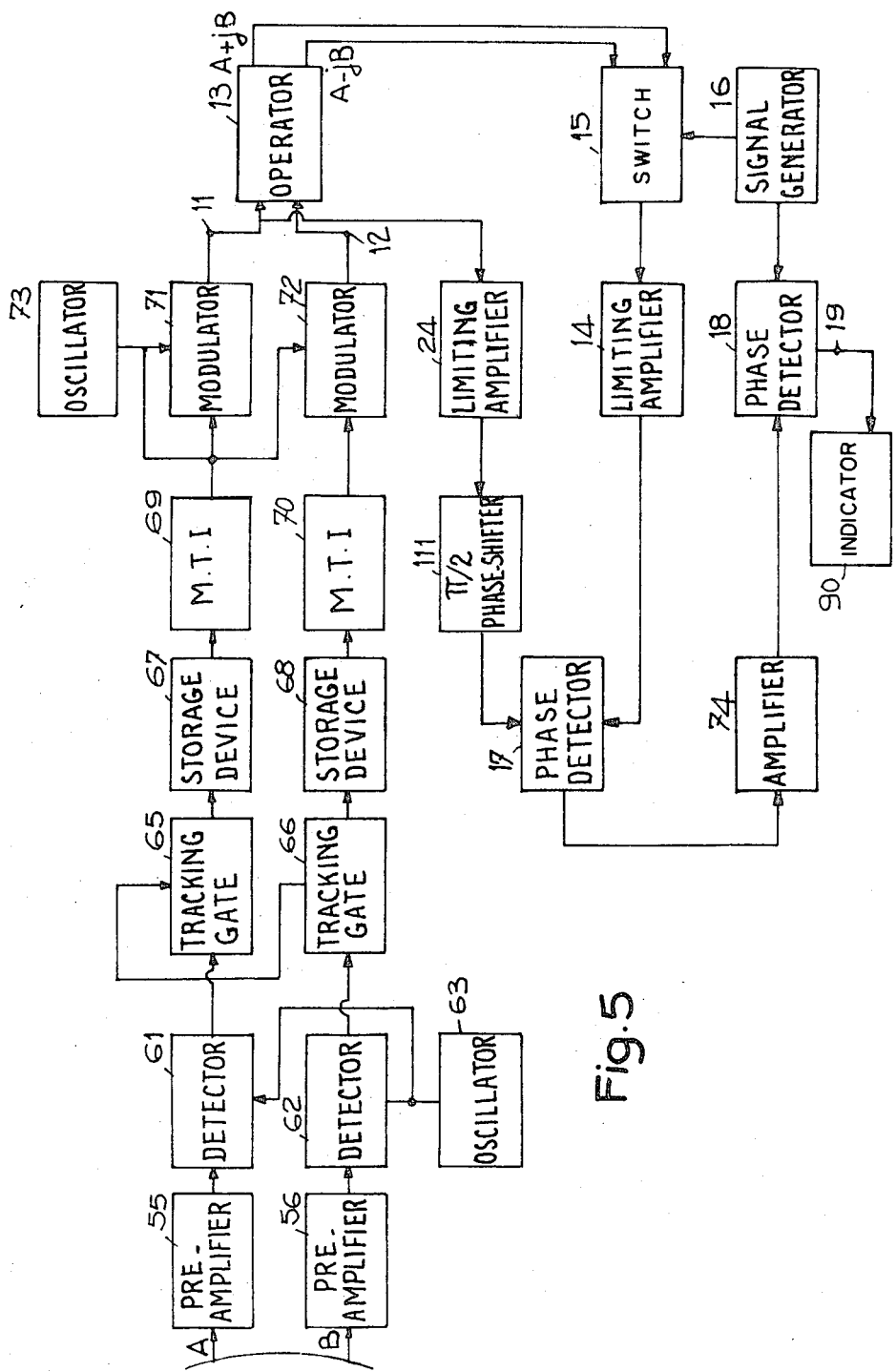

By way of a non-limitative example, FIGS 4 and 5 illustrate diagrams of systems to which the invention has been applied.

FIG. 4 relates to a system for determining the angular position of an active object, for example a remote-controlled vehicle of the beam-riding kind, which object carries a continuous wave transmitter, possibly of the modulated continuous wave kind.

The ultra-high frequency wave of frequency $f_0$ received from the vehicle through channels A and B is converted to the intermediate frequency $f_i$ in the mixers 51 and 52 which, on the other hand, receive the wave of frequency $f_0 + f_i$ from a local oscillator 53 which has its frequency controlled through an automatic frequency control loop 54.

Signals A and B, thus frequency transposed, are applied to the low-grain amplifiers 55 and 56 centered on the frequency $f_i$. The circuit 13 operates at intermediate frequency and supplies the signals $A + jB$ and $A - jB$ which are subsequently processed in accordance with one of the diagrams of FIGS. 1, 2 or 3, for example, in the manner shown in FIG. 1, the output 19 of the detector 18 supplying an angular error indication signal to the indicator 90.

FIG. 5 relates to the determination of the angle of a passive target, by means of a conventional pulse radar in which there is no range ambiguity and which is equipped with a conventional M.T.I. circuit.

The signals A and B are transposed to the intermediate frequency and preamplified. The corresponding circuits have not been shown. At the outputs of the preamplifiers 55, 56, each channel A and B comprises:

a coherent phase detector (61 channel A, 62 channel B) the reference input of which is supplied by the reference oscillator 63 of the system (coherent oscillator);

a tracking gate (65 channel A, 66 channel B) controlled by the target itself, the time of opening of which gate is substantially equal to the duration of the pulses and the target being assumed to have been acquired by conventional means;

a storage device (67 channel A, 68 channel B) for storing the output signals from the coherent detector originating from echoes from one and the same target;

an M.T.I circuit (69 channel A, 70 channel B).

The output signals from the devices 69 and 70, said signals corresponding to a moving target, respectively take the form $|A|\ \cos 2\pi f_{dt}$ and $\pm |B|\ \cos 2\pi f_{dt}$ $|A|$ and $|B|$ being the absolute values of the signals A and B after amplification and filtering thereof, and $f_d$ being the Doppler frequency of the target (possibly determined in an ambiguous manner in accordance with the relative values of the target velocity and the repetition frequency $f_r$).

These are the signals which are to be processed in accordance with the present invention. To this end, respectively in the modulators 71 and 72, they modulate the sinusoidal wave produced by an auxiliary oscillator 73, whose frequency can be selected, for example, in the order of 100 kc/s, the outputs of the modulators being coupled to the operator 13 of FIGS 1, 2 or 3, the latter being followed by the circuits hereinbefore described and an amplifier 74 advantageously being located between the detectors 17 and 18.

The output signal from the detector 18, which is proportional to the target bearing, supplies for example an indicating instrument $I_n$, or, more generally, a processing device.

If the storage of the signals from one recurrence to the next can be discarded, for example if continuous signals, or pulses with a sufficiently high duty factor are used, then the modulators 71 and 72 can be discarded too, by offsetting the reference oscillator of the system (not shown) by a value $F_s$ in relation to the intermediate frequency $f_i$; the rejection devices will then be centered on the frequency $f_s$ and the effective echoes will appear at the output of a rejection device in the form of wave trains of frequency $f_s + f_d$, where $f_d$ is very much smaller than $f_s$; at the input of the operator 13, the sum and difference signals will have the form $$A = |A|\ \cos 2\pi (f_s + f_d)\, t$$

$$B = \pm |B|\ \sin 2\pi (f_s + f_d)\, t.$$

What is claimed, is:

1. A receiver comprising: first means having two terminals for simultaneously receiving two signals A and B whose ratio gives an indication of the angular position of a target; second means coupled to said first means, for elaborating signals $A + jB$ and $A - jB$ where signal $jB$ has the same amplitude as signal B and has a phase shifted by $\pi/2$ with respect to that of signal B, said second means having two outputs; a limiting amplifier having an input and an output; control means for alternately coupling said amplifier input to said two outputs of said second means; phase detecting means having a first input coupled to said amplifier output, a second input, and an output; means coupled to said last mentioned output, for, alternately, in synchronism with said control means, multiplying by $-1$ and $-1$ the signal supplied at said detecting means output; and further means for applying to said detecting means second input a signal which is a function of at least one of signals A and B.

2. A receiver according to claim 1, wherein said control means comprise a switch having a control input and a square wave generator having an output coupled to said switch, and said means for multiplying by $+1$ and $-1$ comprise second phase detecting means having a first input coupled to said first mentioned phase detecting means output and a second input coupled to said generator output.

3. A receiver according to claim 1, for a pulse radar system, said receiver further comprising: means for receiving from a target two signals whose ratio gives an indication of the angular position of the target; means for elaborating respectively from said received two signals two phase detected signals with respect to a reference wave; means for supplying an auxiliary sinusoidal wave, and first and second modulating means for respectively modulating said wave with said detected signals, said modulating means having respective outputs coupled to said terminals of said receiver.

4. A receiver according to claim 1, wherein said further means comprise delay means having an input coupled to said amplifier output and an output coupled to said detecting means second input.

5. A receiver according to claim 4, wherein said further means comprise $\pi/2$ shifting means in series with said delay means.

6. A receiver according to claim 1, wherein said further means comprise a further limiting amplifier having an input coupled to said input for receiving said signal A and an output coupled to said detecting means second input.

7. A receiver according to claim 6, wherein said further means comprise $\pi/2$ shifting means in series with said second limiting amplifier.

8. A receiver according to claim 1, wherein said further means comprise a further limiting amplifier having an input, and an output coupled to said detecting means second input, and means for alternately coupling said further limiting amplifier input to said two outputs of said second means in phase opposition with the coupling of said first amplifier.

9. A receiver according to claim 8, wherein said further means comprise $\pi/2$ phase shifting means in series with said further amplifier.

* * * * *